(12) United States Patent  
Bernhardson

(10) Patent No.: US 12,007,741 B2
(45) Date of Patent: Jun. 11, 2024

(54) AUTOMATION SYSTEM FOR RECEIVING CROPS

(71) Applicant: KWS SAAT SE & Co. KGaA, Einbeck (DE)

(72) Inventor: Duane Bernhardson, Bloomington, MN (US)

(73) Assignee: KWS SAAT SE & Co. KGaA, Einbeck (DE)

( * ) Notice: Subject to any disclaimer, the term of this patent is extended or adjusted under 35 U.S.C. 154(b) by 135 days.

(21) Appl. No.: 17/519,988

(22) Filed: Nov. 5, 2021

(65) Prior Publication Data

US 2024/0053720 A1 Feb. 15, 2024

Related U.S. Application Data

(60) Provisional application No. 63/111,316, filed on Nov. 9, 2020.

(51) Int. Cl.
*G05B 19/05* (2006.01)

(52) U.S. Cl.
CPC .. *G05B 19/058* (2013.01); *G05B 2219/14043* (2013.01)

(58) Field of Classification Search
None
See application file for complete search history.

(56) References Cited

U.S. PATENT DOCUMENTS

| | | | | |
|---|---|---|---|---|
| 5,282,118 A | * | 1/1994 | Lee | F21V 23/0442 362/802 |
| 5,619,182 A | * | 4/1997 | Robb | F21S 10/02 340/815.45 |
| 6,687,616 B1 | * | 2/2004 | Peterson | A01B 79/005 702/5 |
| 8,678,166 B2 | * | 3/2014 | Borgmann | B65G 11/08 198/317 |
| 2005/0028723 A1 | * | 2/2005 | Ancel | G06Q 10/08 116/202 |

(Continued)

FOREIGN PATENT DOCUMENTS

CN 108170084 A * 6/2018
WO WO-2018112615 A1 * 6/2018

OTHER PUBLICATIONS

Hildebrant, "New technology abounds in farm grain handling systems", Jul. 2018, Farm & Ranch Guide, pp. 1-3 (Year: 2018).*

(Continued)

*Primary Examiner* — Mohammad Ali
*Assistant Examiner* — David Earl Ogg
(74) *Attorney, Agent, or Firm* — Troutman Pepper Hamilton Sanders LLP

(57) ABSTRACT

A system analyzes crops provided by a truck on a transport device. The truck enters the transport device to transport and unload the crops. The system includes sensors to detect an identifier of the truck, detect a temperature of the crops, and determine components of the crops. A programmable-logic controller sends paired information between the detected identifier of the truck and the detected location of the crops to a non-transitory storage medium for storage. The processor also sends the detected temperature of the crops and the determined components of the crops to the non-transitory storage medium for storage.

22 Claims, 10 Drawing Sheets

(56) References Cited

U.S. PATENT DOCUMENTS

| | | | |
|---|---|---|---|
| 2005/0197175 A1* | 9/2005 | Anderson | A01G 23/00 460/1 |
| 2010/0216114 A1 | 8/2010 | Friedhoff et al. | |
| 2011/0250038 A1* | 10/2011 | Affleck | B65G 63/067 414/800 |
| 2013/0024330 A1* | 1/2013 | Christie | G06Q 10/08 705/28 |
| 2014/0372166 A1* | 12/2014 | Chanasyk | G06Q 10/06313 705/7.23 |
| 2015/0227135 A1* | 8/2015 | McAdam | G05B 19/414 700/83 |
| 2015/0227873 A1* | 8/2015 | Chiocco | A01D 93/00 705/7.23 |
| 2017/0282784 A1* | 10/2017 | Foster | A01B 76/00 |
| 2018/0047177 A1* | 2/2018 | Obropta | G06T 17/20 |
| 2018/0100844 A1 | 4/2018 | Hilscher et al. | |
| 2018/0356313 A1* | 12/2018 | Russell Jackson | G01N 1/20 |
| 2019/0308552 A1* | 10/2019 | Dominick | B60Q 3/64 |
| 2019/0325533 A1* | 10/2019 | Perry | G06V 20/188 |

OTHER PUBLICATIONS

Skolik et al., "Biospectroscopy for Plant and Crop Science", Comprehensive Analytical Chemistry, 2018, vol. 80, pp. 15-49.

* cited by examiner

AUTOMATION SYSTEM FOR RECEIVING CROPS

CROSS-REFERENCE TO RELATED APPLICATIONS

This application claims priority to U.S. Provisional Application No. 63/111,316, filed Nov. 9, 2020. The entire contents of this application is incorporated herein by reference in its entirety.

FIELD

The present invention relates to a system that uses spectroscopy to perform crop analysis. In particular, the present invention relates to an automation system and method for receiving crops, such as sugar beets, at a piling site.

BACKGROUND

When crops, such as sugar beets, potatoes, sugar cane, peanuts, or any other raw commodities, are harvested, they are typically hauled to a remote receiving site in a truck or similar vehicle. When the truck containing crops arrives at the receiving site, a common method to track crop loads is to record the total weight of the truck and the crops on the truck along with an identifier, such as a number or alpha-numeric string, or a bar code, RFID tag, or optical character recognition (OCR) code. The weight and the identifier are recorded together and printed out on a scale ticket and recorded in a paper or electronic ledger. This process is typically done manually by a person who writes down the identifier, enters it into a system, or manually scans a barcode, OCR code or RFID tag which then records the identifier electronically in the system. This manual operation is fairly labor and time intensive and requires personnel to be in close proximity to heavy equipment.

Once at the receiving site, the crops in the trucks are unloaded on a piler apparatus, which collects the crops as they are dumped out of the truck, removes dirt and other non-crop material, and places the crops into a pile. Samples of the crop are sent to an analytical lab for content analysis, which may take a few or several days. These piles of crops are then typically taken to a factory for further processing.

For the analytical lab testing, a sample from the crop is taken ranging from every third load up to every load, depending on requirements of the downstream processing facility such as a sugar production facility These samples are then collected and transported to a central lab for analysis. In a typical process, 30-40% of all truck loads, in a given time period, are sampled and tested in a lab. Obtaining lab analysis results may take between a half day to four days. On average, 30% of each grower's delivered loads are sampled. In other words, each grower has analytical information limited to 30% of the crop loads delivered.

U.S. Patent Application No. 12/620,764, published as US Publication No. 2010-0216114 A1, is directed to a process for the determination of components in root crops harvested from breeding trial plots. The testing of new varieties of root crops in plots is a usual process in conventional breeding as well as field trials of genetically modified plants. A plot represents a parcel of land of pre-measured size and permits the cultivation of several crops. Their number provides a statistical indication regarding the nature and distribution of for example crop yield. In the production of sugar beets one finds in general about 90 beets per plot. The plots are rated for productive capacity for sugar beets, and, after uprooting, the sugar beets of a plot are analyzed for content in order to obtain the a most accurate analysis result. US Publication No. 2010-0216114 A1 describes the use of near infrared spectroscopy (NIRS) and calibrated spectra for the determination of ingredients like saccharose, glucose or fructose.

U.S. patent application No. 15/288,384, published as U.S. Publication No. US 2018-0100844 A1, is directed to a device for crumbling root crops into substantially equal sized pieces, a device for determining components in root crops and a corresponding method. The system generates a stream of fine pieces and transporting the pieces with the aid of a device, homogenizing or evenly distributing the fine pieces into a stream, irradiating the stream with near infrared light, recording the reflected/absorbed radiation and converting this into a spectral signal for determination of the components.

Near-infrared spectroscopy has never been used at the receiving site, in particular at the piler site, due to the complexities of sample preparation required for the analysis and the required establishment of calibration data at the site. Biospectroscopy for Plant and Crop Science, Paul Skolik, Martin Mcainsh, and Francis Martin, Comprehensive Analytical Chemistry, ISSN: 0166-526X, Vol: 80, Page: 15-49 (2018), describes biospectroscopy techniques, such as mid-infrared (MIR) and Raman spectroscopy, that generate spectral biomarkers for plant samples to study plant and crop biology. In view of the foregoing, a need exists for an automated process to track, identify and/or measure the quantity and quality of crop loads. There is also a need for expediting the process of analyzing and reporting the quality for each load to the grower and the crop company, such as within minutes of the truck being unloaded rather than days so as to allow the grower to make adjustments on the delivery and allow the crop company to know what they are receiving in real time. There is also a need for providing information to the crop company to improve management of storage process.

SUMMARY

Aspects of the disclosed technology include systems and methods for analyzing crops provided by a truck on a transport device. Consistent with the disclosed embodiments, a system includes a non-transitory storage medium configured to store information of the crops. A first sensor is configured to detect an identifier of the truck. A second sensor is configured to detect a location of the crops. A third sensor is configured to detect a temperature of the crops. A spectrometer device is configured to determine components of the crops. The spectrometer device may include one or more of the following: a near infrared spectrometer, an infrared spectrometer, an MIR spectrometer, and a Raman spectrometer. The near infrared spectrometer may perform near infrared irradiation encompassing wavelengths such as from 800 to 2500 nm. A programmable logic controller (PLC) is configured to receive the detected identifier of the truck from the first sensor. The PLC receives the detected location of the crops from the second sensor. The PLC sends paired information between the detected identifier of the truck and the detected location of the off-loaded crops to the non-transitory storage medium for storage. The PLC receives the detected temperature of the crops from the third sensor. The PLC sends the detected temperature of the crops to the non-transitory storage medium for storage. The PLC receives the determined components of the crops from the spectrometer. The PLC sends the determined components of the crops to the non-transitory storage medium for storage.

Another aspect of the disclosed technology relates to a method for transporting and analyzing crops. The method includes transporting and unloading the crops by a truck configured to enter a transport device. A first sensor detects an identifier of the truck. A second sensor detects a location of the off-loaded crop. A third sensor detects a temperature of the crops. A spectrometer device determines components of the crops. A PLC receives the detected identifier of the truck from the first sensor. The PLC receives the detected location of the crops from the second sensor. The PLC sends paired information between the detected identifier of the truck and the detected location of the crops to a non-transitory storage medium for storage. The PLC receives the detected temperature of the crops from the third sensor. The PLC sends the detected temperature of the crops to the non-transitory storage medium for storage. The PLC receives the determined components of the crops from the spectrometer device. The PLC sends the determined components of the crops to the non-transitory storage medium for storage.

A further aspect of the disclosed technology relates to a method for transporting and analyzing crops. The method includes transporting and unloading the crops by a truck configured to enter a transport device. When the truck is present, a camera detects an identifier of the truck. When the crops on the truck are being offloaded from the transport device, a sample arm is triggered to sample the crops, and a GPS location of a piler boom of the transport device is determined. When the sample arm is empty, a weight of the sample arm is determined. The determined weight of the sample arm is sent to a PLC. The sample arm is moved to capture a sample of the crops on the transport device. The sample arm is lifted to a sample chute after the sample of the crops is captured. A weight of the sample of crops is determined when moving the sample of the crops to the sample chute. The determined weight of the sample of crops is sent to the PLC. The sample of the crops is uploaded to the sample chute. The crops may be processed in a chopper. A temperature sensor detects a temperature of the sample of the crops. A spectrometer may optionally be triggered to capture one or more electromagnetic waves of the sample of the crops. In one example, the spectrometer may be triggered to capture and process one or more electromagnetic waves of the sample of the crops to increase accuracy and improve statistics. The electromagnetic waves of the sample of the crops may be sent to the PLC. The electromagnetic waves of the sample of the crops may be stored in a non-transitory storage medium. An RGB camera is triggered to image the sample of the crops and predict an amount of non-crop material. The predicted amount of the non-crop material is sent to the PLC. Upon completion of offloading the crops, the GPS location of the piler boom is sent to the PLC. The GPS location of the piler boom is stored in the non-transitory storage medium.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
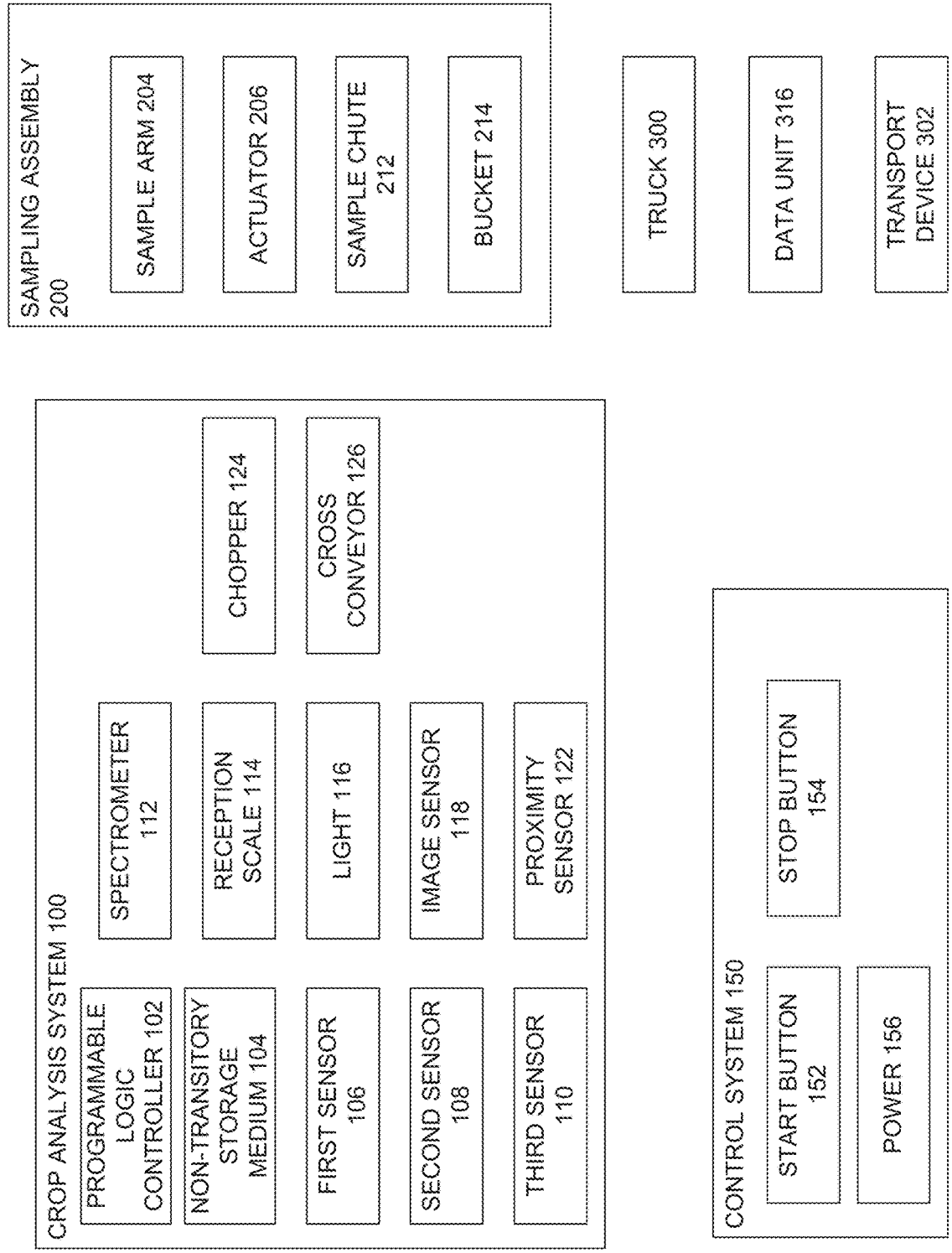
FIG. 1 is a diagram of an example environment that may be used to implement one or more embodiments of the present disclosure.

FIG. 1 shows an example crop analysis system 100 that may implement certain aspects of the present disclosure. The components and arrangements shown in FIG. 1 are not intended to limit the disclosed embodiments as the components used to implement the disclosed processes and features may vary. As shown in FIG. 1, the crop analysis system 100 may include one or more of the following: a programmable logic controller (PLC) 102, a non-transitory storage medium 104, a first sensor 106, a second sensor 108, a third sensor 110, a spectrometer 112, a reception scale 114, one or more lights 116, an image sensor 118, a proximity sensor 122, a chopper 124 and a cross conveyor 126.

The crop analysis system 100 may be operatively or communicatively coupled to one or more of the following: a control system 150, a sampling assembly 200, a transport device 302 and a data unit 316. The sampling assembly 200 may include a sample arm 204, an actuator 206, a sample chute 212 and a bucket 214. The crop analysis 100 may work with the sampling assembly 200.

The control system 150 may include a start button 152, a stop button 154 and a power source 156. The control system 150 may power and control all components of the crop analysis system 100, the transport device 302, the sample arm 204 and the actuator 206.

A truck 300 may provide crops to be analyzed by the crop analysis system 100. The truck may enter the transport device 302 to unload the crops so they can be transported to piles or other storage using a piler boom or similar assembly.

The non-transitory storage medium 104 may be configured to store information of the crops.

The first sensor 106 may be configured to detect an identifier of the truck. This identifier may be a number that references the truck 300, which may identify the grower of the crops, or the field that the crops are harvested from. The first sensor 106 may include at least one of a barcode reader, a camera and a radio-frequency identification (RFID) reader.

The second sensor 108 may be configured to detect a location of the crops. The second sensor 108 may include a GPS sensor. The GPS location may identify the location of where the load of crops is located in the pile, which may help a user understand where the best and the poorest crops are located.

The third sensor 110 may be configured to detect a temperature of the crops. The third sensor 110 may include a temperature sensor. Temperature is important in storing the crop. Some receiving stations may not accept crops that are below 27° F. or over 55° F. if they are going to store them for a long term, such as over 200 days.

The spectrometer 112 may be configured to determine components of the crops. The spectrometer 112 may be configured to perform one or more of the following: near infrared spectroscopy, infrared spectroscopy, MIR spectroscopy, and Raman spectroscopy.

The reception scale 114 may be configured to determine a weight of the truck 300. A scale processor may be located inside a scale house or a control box.

The light 116 may be a status light bar. The light 116 may be configured to display different colors to indicate different statuses of the system 100.

Figure 2:
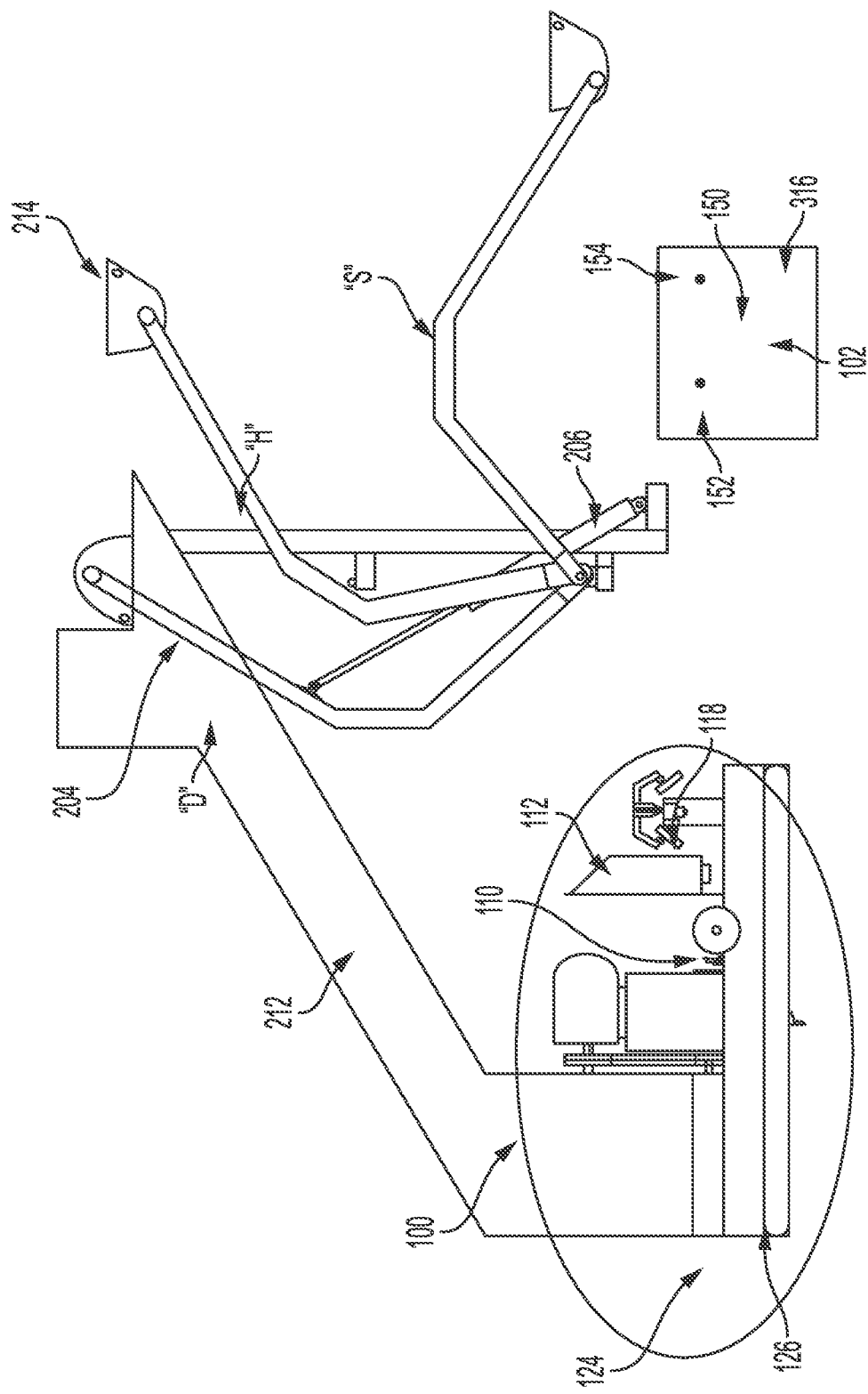
FIG. 2 is a schematic illustration of a crop analysis system installed on a transport device according to one aspect of the present disclosure.
Figure 3:
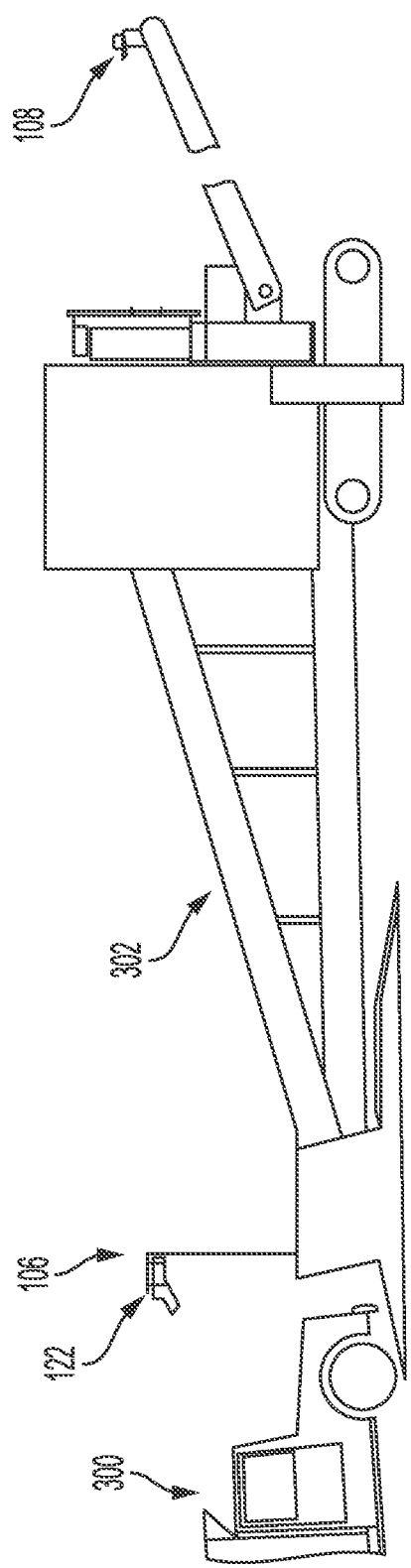
FIG. 3 is a schematic illustration of a first sensor and a proximity sensor mounted on the transport device for identifying a truck according to one aspect of the present disclosure.

Turning to FIGS. 2 and 3, the crop analysis system 100 and the sample arm 204 may be installed onto the transport device 302. The transport device 302 may include a piler. The piler may be a beet piler. The transport device 302 may aid in the unloading of the crops from the truck 300 into a pile or directly to the factory. When the crop analysis system 100 is integrated into transport device 302, the crop analysis system 100 on the transport device 302 may allow for analysis of each load of crops when it is unloaded.

As illustrated in FIG. 2, the sample arm 204 may be actuated to move among a few positions, including a sample position "S" to gather samples of the crops from the transport device 302, a dump position "D" to dump crops onto sample chute 212, and a home position "H". Extension and retraction of the actuator 206 results in movement of the sample arm 204 between the "D", "H" and "S" positions.

The crop analysis system 100 may provide an opportunity for reducing the labor needed and provides an opportunity to sample each load, outperforming the existing methodology of sampling only 30-40% of the loads.

In one embodiment, the labor involved in the unloading and sampling processes can be further reduced by automating the unloading and analysis process. For example, the first sensor 106 may be configured to identify the truck 300 that is unloading. Each truck 300 may have a unique identifier that may be scanned by the first sensor 106.

The PLC 102 may be configured to receive the detected identifier of the truck 300 from the first sensor 106. The PLC 102 may receive the detected location of the crops from the second sensor 108. The PLC 102 may pair the truck identifier with the sample taken and the detected location of the crops in the pile. The PLC 102 may send paired information between the detected identifier of the truck 300 and the detected location of the crops to the non-transitory storage medium 104 for storage. The PLC 102 may receive the detected temperature of the crops from the third sensor 110. The PLC 102 may send the detected temperature of the crops to the non-transitory storage medium 104 for storage.

The PLC 102 may be configured to control the process and collect results from the first sensor, the second sensor, the third sensor and the spectrometer.

In one embodiment, the PLC 102 may receive the determined components of the crops from the spectrometer 112. In another embodiment, the PLC 102 may be configured to determine the components of the crops based on data obtained from the image sensor 118. The image sensor 118 may include a camera or any other visible light sensor. The image sensor 118 may be used in conjunction with the spectrometer 112 to determine components of the crops. Examples of the determined components of the crops include, but are not limited, to, sugar content, dry matter content, recoverable sugar content, elemental content, and the like.

The PLC 102 may send the determined components of the crops to the non-transitory storage medium for storage 104.

The PLC 102 may be configured to transmit the determined components of the crops, via a network, to a data unit 316. The data unit 316 may be a computing device such as a personal computer. The network may be of any suitable type, including individual connections via the internet such as cellular or WiFi networks.

The PLC 102 may be configured to record an identifier and a weight of the crops placed on the reception scale 114. For example, the PLC 102 may send a signal to the first sensor 106 when the crops are present on the reception scale 114. The PLC 102 may turn on the light 116 to indicate readiness to detect the identifier of the truck 300. The first sensor 106 may scan the identifier of the truck 300.

The PLC 102 may receive the scanned identifier from the first sensor 106. The PLC 102 may change the light 116 to a first color to indicate that the identifier has been scanned. The PLC 102 may receive data indicating a determined amount of a weight of the crops captured by the reception scale 114. The PLC 102 may change the light 116 to a second color signaling unloading of the crops.

The proximity sensor 122 may be configured to determine whether the truck 300 has approached. The PLC 102 may be configured to instruct the light 116 to display a first color indicating that the truck 300 has approached. For instance, the first color may be orange.

The PLC 102 may be configured to instruct the light 116 to display a second color indicating that the first sensor 106 successfully detects the identifier of the truck 300. For instance, the second color may be red.

The PLC 102 may be configured to instruct the light 116 to display a color at a predetermined frequency to indicate that manual scan is needed. For example, the light 116 may flash red in this instance.

The PLC 102 may be configured to instruct the light 116 to display a third color indicating that the weight of the truck 300 is captured. For example, the third color may be green.

The PLC 102 may be configured to turn off the light 116 when the truck 300 leaves the reception scale 114.

The sample arm 204 may be disposed on the transport device 302 for capturing samples of the crops.

In one embodiment, as illustrated in FIG. 3, the truck 300 may be identified by the first sensor 106 as the truck 300 pulls onto the transport device 302. The proximity sensor 122 may detect entry of the truck 300 onto the transport device 302.

Figure 4:
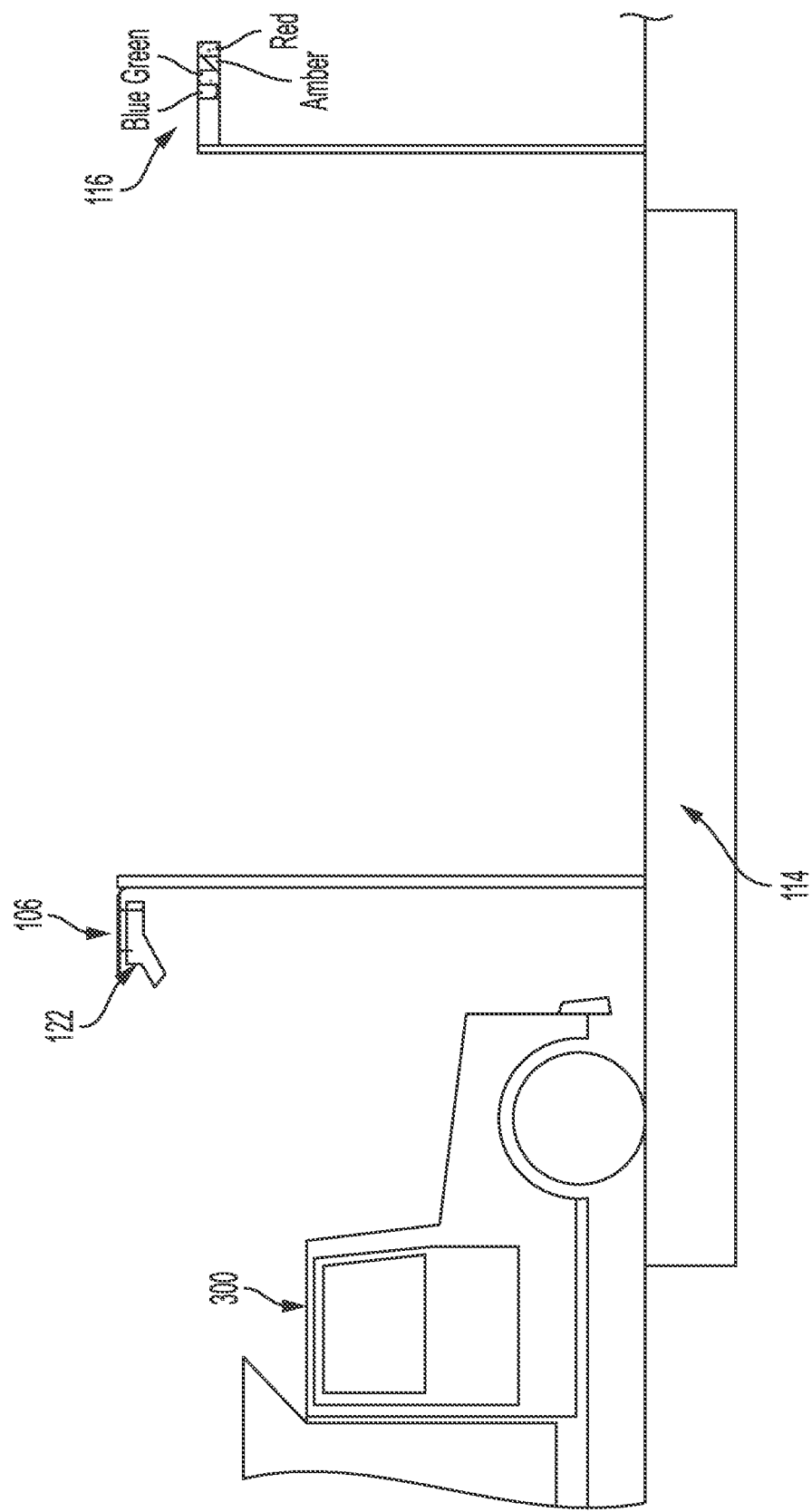
FIG. 4 is a schematic illustration of the first sensor and the proximity sensor mounted on a reception scale for identifying the truck according to one aspect of the present disclosure.

In another embodiment, as illustrated in FIG. 4, the truck 300 may be identified by the first sensor 106 as the truck 300 pulls onto the reception scale 114. The proximity sensor 122 may detect entry of the truck 300 onto the reception scale 114. The reception scale 114 may measure a gross weight of the truck 300 upon arrival at a receiving station, when the truck 300 is loaded with crops. The reception scale 114 may weigh the truck 300 again when the truck 300 becomes empty.

Figure 5:
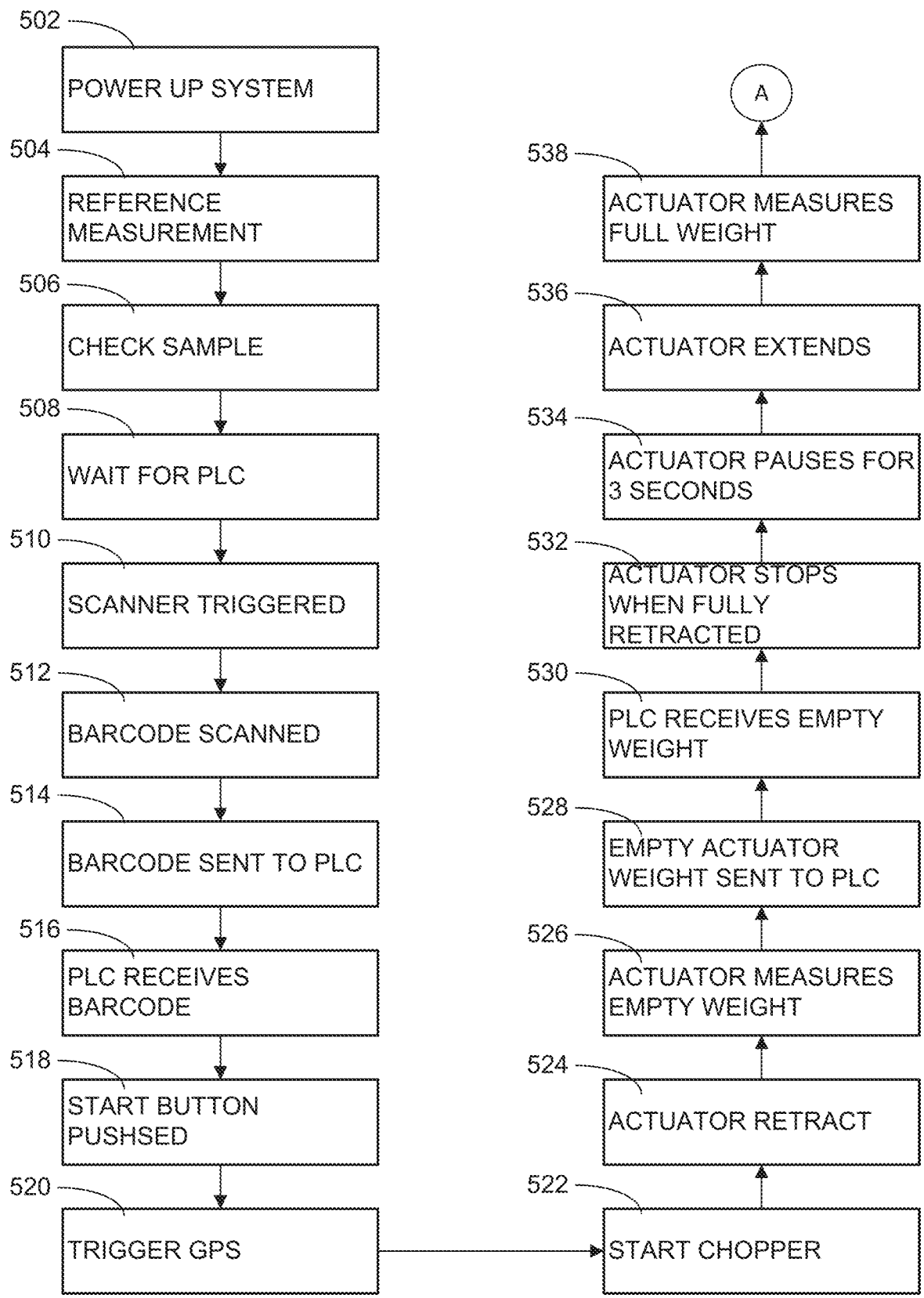
FIGS. 5-6 are an example flow chart of a crop analysis process according to one aspect of the present disclosure.
Figure 6:
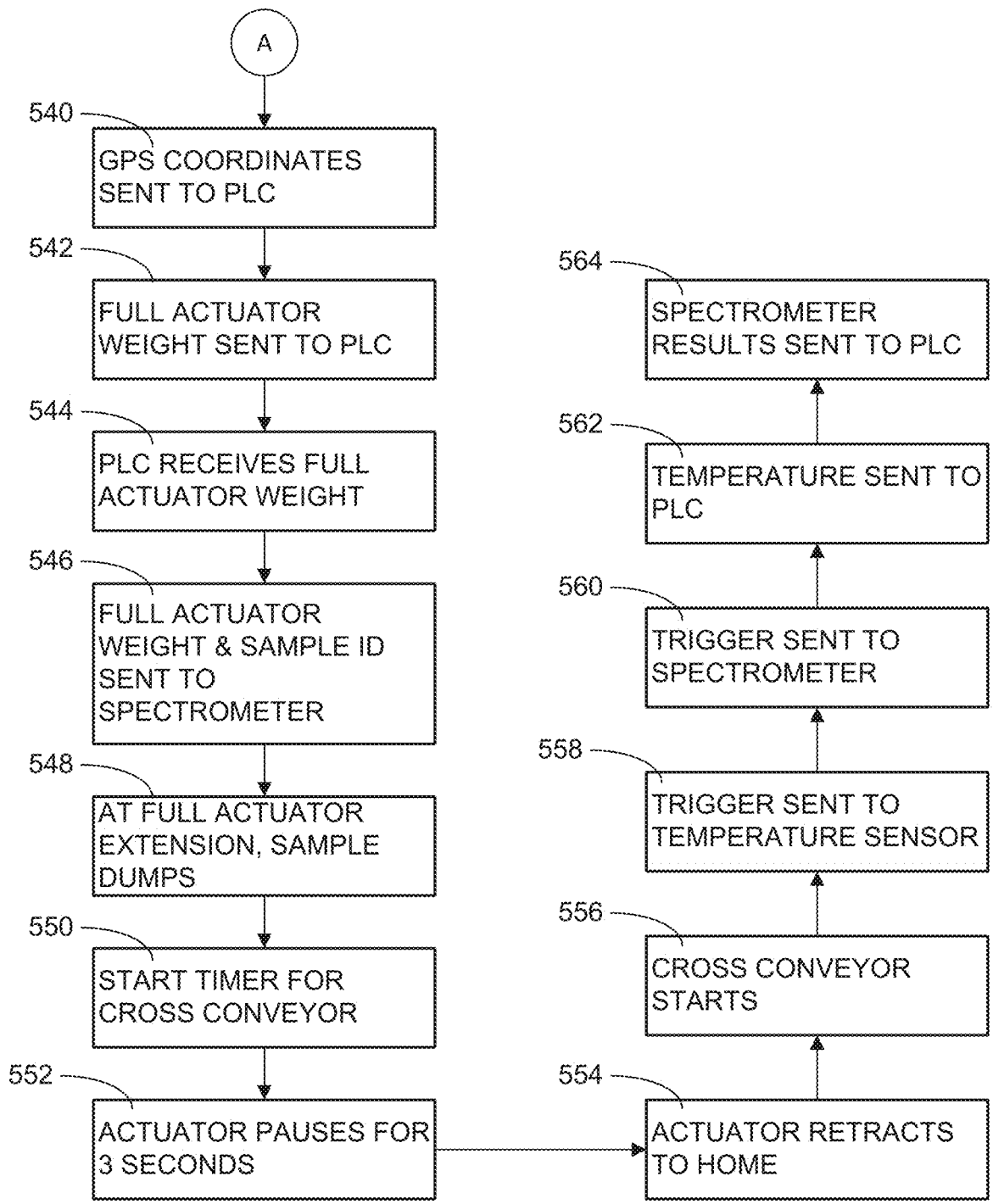

FIGS. 5-6 illustrate an example flow chart of a process performed according to the disclosed technology. At 502, the crop analysis system 100 may be powered up. At 504, reference measurement may take place to adapt the system to potential changes in environment, temperature and humidity. At 506, sample of the crops may be checked by using a check plate to perform a diagnostic measurement to ensure that the system is operating properly. At 508, wait for the PLC 102 to indicate that the system is ready. At 510, the first sensor 106 may be triggered by an approaching truck to perform a scan. The first sensor may be triggered by a proximity sensor. At 512, a barcode of the truck 300 may be scanned by the first sensor 106. At 514, the barcode may be sent to the PLC 102. At 516, the PLC 102 may receive the barcode. At 518, the start button 152 may be pushed. At 520, the second sensor 108 may be triggered to detect GPS location. The second sensor 108 may be triggered by the PLC 102. At 522, the chopper 124 may start under the instruction of the PLC. At 524, the sample arm 204 and the actuator 206 may retract. The PLC may trigger the retraction. The actuator may retract, resulting in movement of the sample arm from the "D" or "H" to the "S" position. At 526, a weight of the empty sample arm 204 and the bucket 214 may be measured by the actuator. At 528, the measured weight may be sent to the PLC 102. At 530, the PLC 102 may receive the measured weight. A 532, the actuator 206 may stop when the sample arm 204 is fully retracted. At 534, the actuator 206 may pause for a predetermined amount of time, such as three seconds, or any period of time sufficient for the sample bucket 214 to collect a sample of the crop from the transport device 302. At 536, the actuator 206 may extend, moving the sample arm from the "S" or "H" position to the "D" position. At 538, a full weight of the sample arm 204, the bucket 214 and crop may be measured by the actuator 206. The actuator may measure the weight by an internal process in the actuator using torque and amperage. At 540, GPS coordinates may be sent to the PLC 102. At 542, the full weight of the actuator 206 may be sent to the PLC 102. At 544, the PLC 102 may receive the full actuator weight. At 546, the full actuator weight and the sample ID may be sent to the spectrometer 112. The sample ID may be the truck ID. At 548, when the actuator 206 is fully extended, a sample of the crops may be dumped into the sample chute 212 through which the crop sample is deposited to chopper 124. At 550, a timer may be started for the cross conveyor 126. At 552, the actuator 206 may pause for a predetermined amount of time, such as three seconds. At 554, the actuator 206 may retract to home. At 556, the cross conveyor 126 may start. At 558, a trigger may be sent by the PLC to the third sensor 110 to detect temperature of the crops. At 560, a trigger may be sent by the PLC to the spectrometer 112 to determine components of the crops. At 562, the detected temperature may be sent to the PLC 102. At 564, results from the spectrometer 112 may be sent to the PLC 102.

Figure 7:
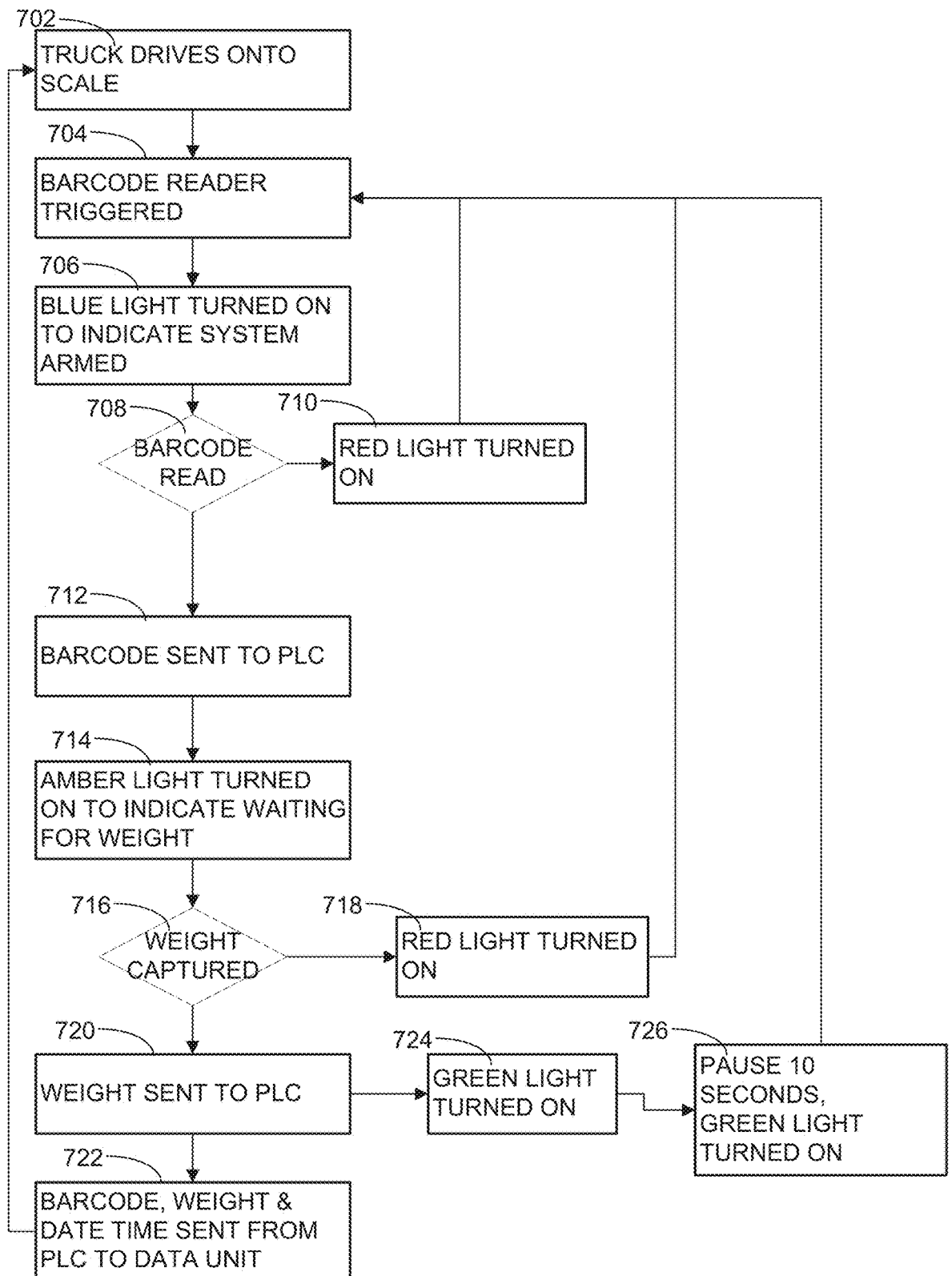
FIG. 7 is an example flow chart of a process for scanning a barcode associated with the truck according to one aspect of the present disclosure.

FIG. 7 illustrates an example flow chart of a process for scanning a barcode associated with the truck 300. At 702, the truck 300 may drive onto the reception scale 114. At 704, the first sensor 106, such as a barcode reader, may be triggered by the proximity sensor. The proximity sensor may determine when the truck has approached. At 706, a blue light may be turned on to indicate that the truck 300 has approached. At 708, the first sensor 106 may read the barcode. At 710, after the barcode is read, a red light may be turned on. At 712, the barcode may be sent to the PLC 102. At 714, an amber light may be turned on to indicate a status of waiting for weight measurement of the crops. At 716, the weight of the crops may be captured. At 718, a red light may be turned on after the weight of the crops is captured. At 720, the weight of the crops may be sent to the PLC 102. At 724 and 726, a green light may be turned on after pausing for ten seconds. At 722, the PLC 102 may send the barcode, the weight of the crop and date time to the data unit 316. Once the barcode, weight, time and date data have been sent to the PLC, the load is moved to the location it will be stored and the crops are dumped onto the transport device 302 for piling and sampling as described above.

After sampling, the crop analysis system 100 generates component information for each crop. Once the component information of the crop being delivered is obtained, the component information of that crop may be uploaded to the data unit 316 for correlation or pairing with the barcode, weight, time and date data of that crop, thereby facilitating review of the quality of analysis on the sample from that crop. This information is then sent, for example, to a crop company, such as a sugar company, to use for payment and sharing with a grower. This process provides crop-specific data at the receiving facility, such as a piling site, in real time to the grower and the buyer without the need for sending samples offsite to an analytical lab for obtaining the component information.

Figure 8:
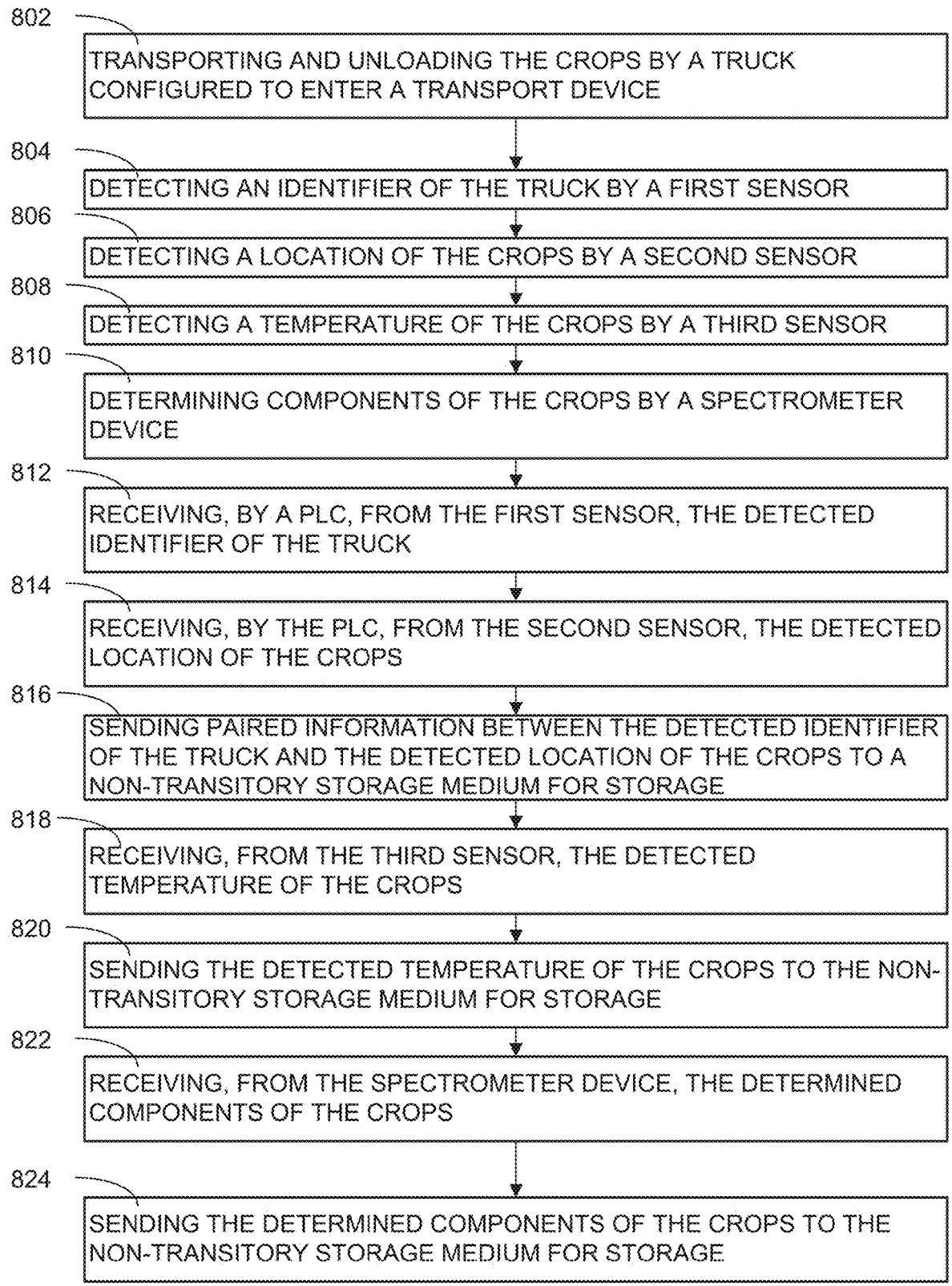
FIG. 8 is an example flow chart of a process performed by the crop analysis system according to one aspect of the present disclosure.

FIG. 8 illustrates an example flow chart of a process performed by the crop analysis system 100. At 802, the truck 300 may enter the transport device 302, transport and unload the crops. At 804, the first sensor 106 may detect an identifier of the truck 300. At 806, the second sensor 108 may detect a location of the crops. At 808, the third sensor 110 may detect a temperature of the crops. At 810, the spectrometer 112 may determine components of the crops. At 812, the PLC 102 may receive from the first sensor 106 the detected identifier of the truck 300. At 814, the PLC 102 may receive from the second sensor 108 the detected location of the crops. At 816, the PLC 102 may send paired information between the detected identifier of the truck 300 and the detected location of the crops to the non-transitory storage medium 104 for storage. At 818, the PLC 102 may receive from the third sensor 110 the detected temperature of the crops. At 820, the PLC 102 may send the detected temperature of the crops to the non-transitory storage medium 104 for storage. At 822, the PLC 102 may receive the determined components of the crops from the spectrometer 112. At 824, the PLC 102 may send the determined components of the crops to the non-transitory storage medium 104 for storage.

In one embodiment, the reception scale 114 may determine the weight of the truck 300 as the truck 300 enters the transport device 302.

In one embodiment, the PLC 102 may instruct the light 116 to display different colors to indicate different statuses of the crop analysis system 100 to a driver. In one example, the light 116 may include a plurality of lights, including blue light, red light, amber light, and green light. As a result, the driver may become notified of the status of the crop analysis system 100 or its process based on different colors.

In one embodiment, the proximity sensor 122 may determine whether the truck 300 has approached. The PLC 102 may instruct the light 116 to display a first color indicating that the truck 300 is has approached. The PLC 102 may instruct the light 116 to display a second color indicating that the first sensor 106 successfully detects the identifier of the truck 300. The PLC 102 may instruct the light 116 to display a color at a predetermined frequency to indicate that manual scan is needed. The PLC 102 may instruct the light 116 to display a third color indicating that the weight of the truck 300 is captured.

Figure 9:
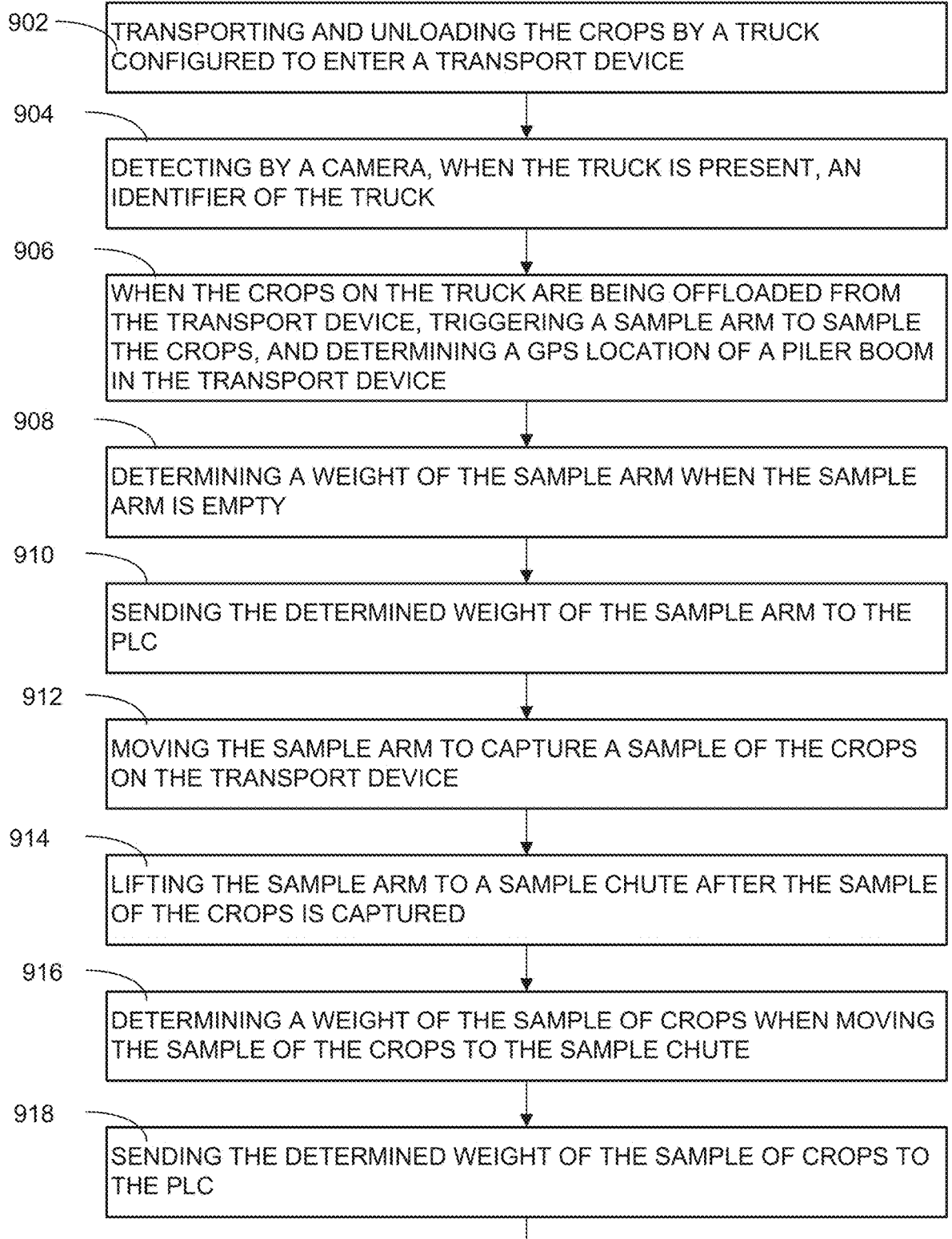
FIGS. 9-10 illustrate another example flow chart of a process performed by the crop analysis system according to one aspect of the present disclosure.
Figure 10:
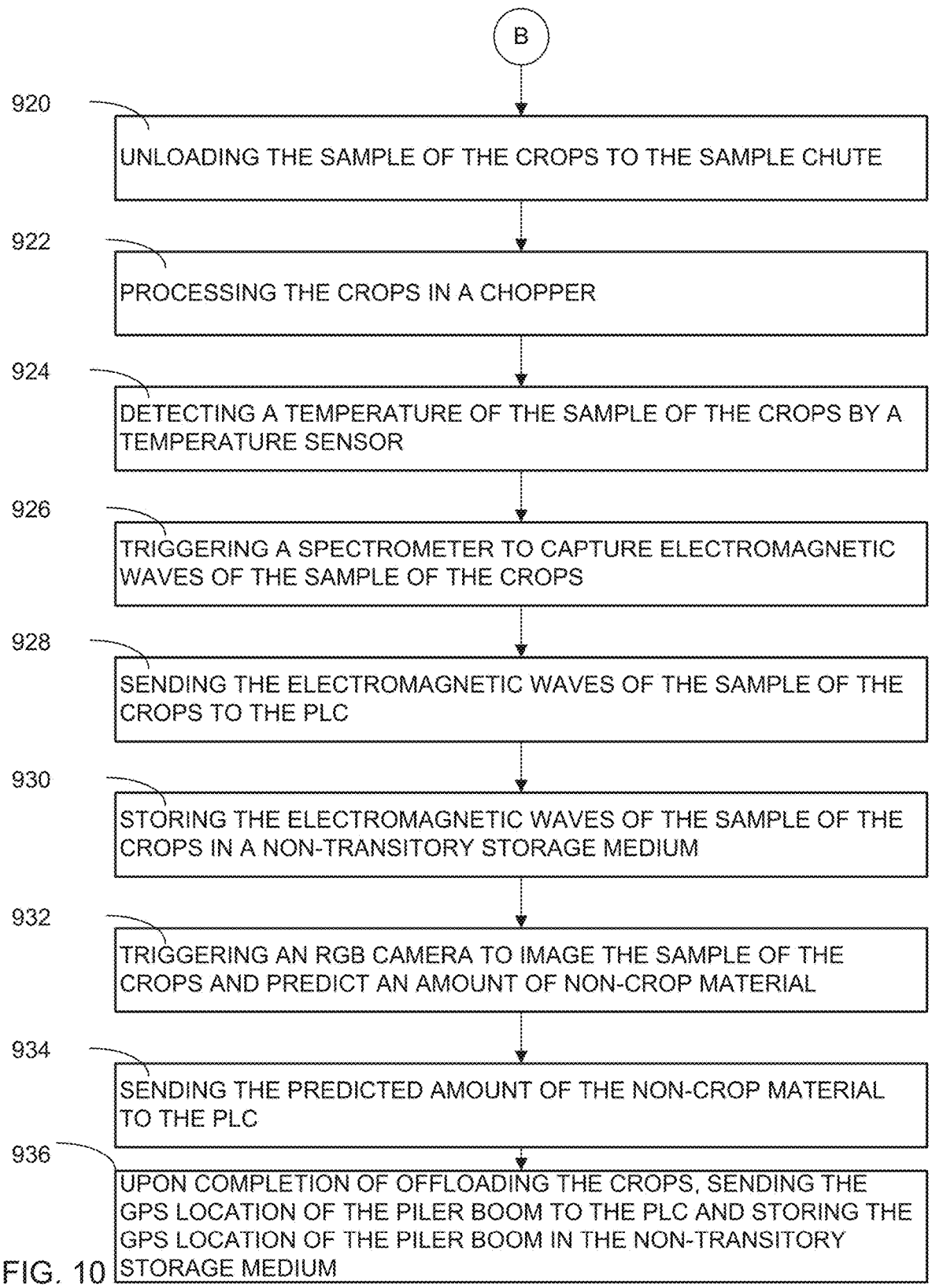

FIGS. 9-10 illustrate an example flow chart of a process performed by the crop analysis system 100. At 902, the truck 300 may enter the transport device 302, and then unload and transport the crops. At 904, when the truck 300 is present, the first sensor 106 such as a camera may detect an identifier of the truck 300. At 906, when the crops on the truck 300 are being offloaded from the truck 300 to the transport device 302, the sample arm 204 may be triggered to sample the crops, and a GPS location of a piler boom of the transport device 302 may be determined. At 908, a weight of the sample arm 204 may be determined when the sample arm 204 is empty. At 910, the determined weight of the sample arm 204 may be sent to the PLC 102. At 912, the sample arm 204 may be moved to capture a sample of the crops on the transport device 302. At 914, the sample arm 204 may be lifted to the sample chute 212 after the sample of the crops is obtained. At 916, when moving the sample of the crops to the sample chute, the weight of the sample of crops may be determined. At 918, the determined weight of the sample of crops may be sent to the PLC 102. At 920, the sample of the crops may be unloaded to the sample chute 212. At 922, the crops may be processed in the chopper 124. At 924, the third sensor 110 may detect a temperature of the sample of the crops. At 926, the spectrometer 112 may be triggered to capture electromagnetic waves of the sample of the crops. In one example, the spectrometer may be triggered to capture and process electromagnetic waves of the sample of the crops to increase accuracy and improve statistics. At 928, the electromagnetic waves of the sample of the crops may be sent to the PLC 102. At 930, the electromagnetic waves of the sample of the crops may be stored in the non-transitory storage medium 104. At 932, an RGB camera may be triggered to image the sample of the crops and predict an amount of non—crop material. At 934, the predicted amount of the non-crop material may be sent to the PLC 102. At 936, upon completion of offloading the crops, the GPS location of the piler boom may be sent to the PLC 102, and the GPS location of the piler boom may be stored in the non-transitory storage medium 104.

In one embodiment, the information stored in the non-transitory storage medium 104 in connection with the crops may be transmitted to the data unit 316 via a network.

In one embodiment, the non-transitory storage medium 104 may store a calibration data set. This calibration data set may add data of samples every year from different locations and varieties to account for the environment that crops are grown in and how the environment influences the crop quality.

The non-transitory computer readable medium 104 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 104. The non-transitory computer readable medium 104 may include one or more memory devices that store data and instructions used to perform one or more features of the disclosed embodiments. The non-transitory computer readable medium 104 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases.

The technology described herein eliminates the need to transport samples to a central lab, thereby increasing sampling rate, providing more information in regards to crop quality in the storage pile, georeferencing the location of each load for better traceability, and using automation to reduce labor, and increasing safety of workers by being able to locate them out of harm's way during truck unloading. The disclosed technology allows the grower to make adjustments on the delivery and allow the crop company to know what they are receiving in real time and the location of those crops when they are placed in the bulk pile. By using this technology, factories can forego the operation of their own laboratories, or the use of external third-party laboratories, for the analysis of crop ingredients, saving time, labor and testing materials required for off-site testing.

The crop analysis system 100 and methods described herein may be used with other deliveries to factories and similar processes in other industries. In one example, the barcode process illustrated in FIG. 7 may be used for any commodity delivered via a transport vehicle.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for analyzing crops provided by a truck onto a transport device, comprising:
    a non-transitory storage medium configured to store information of the crops;
    a first sensor configured to detect an identifier of the truck in real-time;
    a second sensor configured to detect a location of the crops in real-time;
    a third sensor configured to detect a temperature of the crops in real-time;
    a spectrometer device configured to determine components of the crops in real-time; and
    a programmable logic controller (PLC) configured to:
        receive, from the first sensor, the detected identifier of the truck;
        receive, from the second sensor, the detected location of the crops;
        send paired information between the detected identifier of the truck and the detected location of the crops to the non-transitory storage medium for storage;
        cause a sample arm to capture the crops;
        cause an actuator to weigh the crops;
        receive a weight of the crops from the actuator;
        operate a chopper to chop the crops;
        receive, from the third sensor, the detected temperature of the chopped crops;
        send the detected temperature of the chopped crops to the non-transitory storage medium for storage;
        receive, from the spectrometer device, the determined components of the chopped crops based on the weight of the crops;
        send the determined components of the chopped crops to the non-transitory storage medium for storage;
        generate, in real-time, a report comprising the paired information, the detected temperature of the chopped crops, and the determined components of the chopped crops; and
        transmit, in real-time, the report to an external device associated with a grower and/or a company.

2. The system of claim 1, wherein the PLC is configured to transmit the determined components of the chopped crops, via a network, to a computing device.

3. The system of claim 1, wherein the PLC is configured to record an identifier and a reception weight of the crops placed on a reception scale, comprising:
    causing, by the PLC, the sample arm to transport the crops to the reception scale;
    sending, by the PLC, a signal to the first sensor when the crops are present on the reception scale;
    turning on a light to indicate readiness to detect the identifier of the truck;
    scanning, by the first sensor, the identifier of the truck;
    receiving, by the PLC, the scanned identifier from the first sensor;
    changing the light to a first color to indicate that the identifier has been scanned;
    receiving, by the PLC, data indicating a determined amount of the reception weight of the crops captured by the reception scale; and
    changing the light to a second color signaling unloading of the crops.

4. The system of claim 1, wherein at least one of the first sensor, second sensor or third sensor include at least one of a barcode reader, a camera, a radio-frequency identification (RFID) reader, a Global Positioning Satellite (GPS) sensor, or a temperature sensor.

5. The system of claim 1, wherein the spectrometer device includes one or more of the following: a near infrared spectrometer, an infrared spectrometer, an mid-infrared (MIR) spectrometer, and a Raman spectrometer.

6. The system of claim 1, further comprising an image sensor, wherein the image sensor includes a camera.

7. The system of claim 1, further comprising a reception scale configured to determine a weight of the truck as the truck enters the transport device.

8. The system of claim 1, further comprising a light configured to display different colors to indicate different statuses of the system.

9. The system of claim 8, further comprising a proximity sensor configured to determine whether the truck has approached, wherein the PLC is configured to instruct the light to display at least one of a first color indicating that the truck has approached, a second color indicating that the first sensor successfully detects the identifier of the truck, or a third color indicating that a weight of the truck is captured.

10. The system of claim 8, wherein the PLC is configured to instruct the light to display a color at a predetermined frequency to indicate that manual scan is needed.

11. The system of claim 8, wherein the PLC is configured to turn off the light when the truck leaves a reception scale.

12. The system of claim 1, wherein the sample arm is disposed on the transport device for capturing samples of the crops.

13. The system of claim 1, wherein the transport device includes a piler.

14. A method for transporting and analyzing crops, comprising:
 detecting, by a programmable logic controller (PLC) in real-time, an identifier of the truck by a first sensor;
 detecting, by the PLC in real-time, a location of the crops by a second sensor;
 detecting, by the PLC in real-time, a temperature of the crops by a third sensor;
 determining, by the PLC in real-time, components of the crops by a spectrometer device;
 receiving, by the PLC, from the first sensor, the detected identifier of the truck;
 receiving, by the PLC, from the second sensor, the detected location of the crops;
 sending, by the PLC, paired information between the detected identifier of the truck and the detected location of the crops to a non-transitory storage medium for storage;
 receiving, by the PLC and from the third sensor, the detected temperature of the crops;
 sending, by the PLC, the detected temperature of the crops to the non-transitory storage medium for storage;
 receiving, by the PLC and from the spectrometer device, the determined components of the crops;
 sending, by the PLC, the determined components of the crops to the non-transitory storage medium for storage;
 generating, by the PLC and in real-time, a report comprising the paired information, the detected temperature of the crops, and the determined components of the crops; and
 transmitting, by the PLC and in real-time, the report to an external device associated with a grower and/or a company.

15. The method of claim 14, further comprising: determining, by a reception scale, a weight of the truck as the truck enters a transport device.

16. The method of claim 15, further comprising:
 displaying, by a light, different colors to indicate different statuses.

17. The method of claim 16, further comprising:
 determining, via a proximity sensor, whether the truck has approached; and
 instructing, by the PLC, the light to display a first color indicating that the truck had approached.

18. The method of claim 16, further comprising:
 instructing, by the PLC, the light to display a second color indicating that the first sensor successfully detects the identifier of the truck, and instructing, by the PLC, the light to display a third color indicating that the weight of the truck is captured.

19. The method of claim 16, further comprising:
 instructing, by the PLC, the light to display a color at a predetermined frequency to indicate that manual scan is needed.

20. A method for transporting and analyzing crops, comprising:
 detecting, by a programmable logic controller (PLC) and a camera, when a truck is present,
 an identifier of the truck;
 when the crops on the truck are being offloaded from a transport device, triggering, by the PLC, a sample arm to sample the crops, and determining, by the PLC and a Global Positioning Satellite (GPS) sensor, a GPS location of a piler boom in the transport device;
 determining, by the PLC, a weight of the sample arm when the sample arm is empty;
 sending, by the PLC, the determined weight of the sample arm to a programmable logic controller (PLC);
 moving, by the PLC, the sample arm to capture a sample of the crops on the transport device;
 lifting, by the PLC, the sample arm to a sample chute after the sample of the crops is captured;
 determining, by the PLC, a weight of the sample of crops when moving the sample of the crops to the sample chute;
 receiving, by the PLC, the determined weight of the sample of crops;
 causing, by the PLC, the sample arm to unload the sample of the crops at the sample chute;
 causing, a chopper to process the crops;
 detecting, by the PLC and a temperature sensor, a temperature of the sample of the crops;
 triggering, by the PLC, a spectrometer to capture electromagnetic waves of the sample of the crops;
 receiving, by the PLC, the electromagnetic waves of the sample of the crops;
 storing, by the PLC, the electromagnetic waves of the sample of the crops in a non-transitory storage medium;
 triggering, by the PLC, an Red Green Blue (RGB) camera to image the sample of the crops and predict an amount of non-crop material;
 receiving, by the PLC, a predicted amount of the non-crop material;
 upon completion of offloading the crops, receiving by the PLC, the GPS location of the piler boom and storing, by the PLC, the GPS location of the piler boom in the non-transitory storage medium;
 generating, by the PLC in real-time, a report comprising the determined weight of the sample of crops, the temperature of the sample of the crops, and the predicted amount of the non-crop material; and
 transmitting, by the PLC in real-time, the report to an external device associated with a grower and/or a company.

21. The method of claim 20, further comprising transmitting information stored in the non-transitory storage medium in connection with the crops to a computing device via a network.

22. The system of claim 1, wherein the spectrometer device comprises a near infrared spectrometer and is configured to determine the components of the crops by performing near infrared irradiation encompassing wavelengths between approximately 800 and 2500 nanometers (nm).

\* \* \* \* \*